United States Patent [19]
Mooney

[11] Patent Number: 5,967,532
[45] Date of Patent: Oct. 19, 1999

[54] TOWABLE AUGER CARRIER FOR SNOW MACHINES

[76] Inventor: Edward Mooney, P.O. Box 1331, Big Lake, Ak. 99652

[21] Appl. No.: 08/901,993

[22] Filed: Jul. 29, 1997

[51] Int. Cl.[6] .................................................. B62B 9/04
[52] U.S. Cl. ............................... 280/24; 280/19; 180/186
[58] Field of Search ....................... 280/24, 500, 491.4, 280/491.5, 492, 19, 900, 491.2, 489, 482; 180/180, 186, 182

[56] References Cited

U.S. PATENT DOCUMENTS

| | | | |
|---|---|---|---|
| 4,046,393 | 9/1977 | Vadnais | 280/19 |
| 4,282,666 | 8/1981 | Brandt | 37/195 |
| 5,090,714 | 2/1992 | Seekins et al. | 280/24 |
| 5,280,940 | 1/1994 | Kendall | 280/492 |
| 5,346,245 | 9/1994 | Budrow et al. | 280/655 |
| 5,544,944 | 8/1996 | Keech | 280/482 |

FOREIGN PATENT DOCUMENTS 796637  10/1968  Canada ..................................... 280/24

*Primary Examiner*—Paul N. Dickson
*Assistant Examiner*—Lynda Jasmin
*Attorney, Agent, or Firm*—Michael J. Tavella

[57] ABSTRACT

An auger carrier designed to hold augers and to be towed behind a snow machine. The device has a curved bottom plate that holds the auger cutting head. Two extension arms are attached to the curved plate. The extension arms are used to extend the length of the auger carrier so that the full length of the auger can be carried. At the top of the extension arms is the mounting plate assembly. This assembly has a fixture for mounting the auger carrier to the back frame of a snow machine, which is then connected by a pivot to a locking mechanism that secures the handle of the auger. The pivot allows the auger carrier to move freely with respect to the snow machine while under tow.

13 Claims, 7 Drawing Sheets

5,967,532

TOWABLE AUGER CARRIER FOR SNOW MACHINES

This invention relates to auger carriers and particularly to auger carriers that are towed behind snow machines.

BACKGROUND OF THE INVENTION

Ice fishing is an increasingly popular winter activity. To go ice fishing, one needs basic fishing gear and a way of making a hole through lake or river ice. Typically these holes are made by lightweight power augers. These augers have a cutting head, a long thin shaft and a pair of curved handles. A motor is attached to the shaft to turn the cutting head. Using an auger makes light work of ice fishing holes, but it is an awkward tool to carry. Unless one has access by road to a lake or river, one needs to go cross country to reach the fishing location. To travel significant distances, one typically uses a snow mobile (or snow machine) to reach the fishing spot. Although sleds are available for snow machines, these sleds are not shaped to easily carry an auger. This makes carrying an auger into remote spots difficult at best. The augers tend to roll off sleds and do not fit completely in the sleds. Nor are they easily carried on a snow machine seat.

BRIEF SUMMARY OF THE INVENTION

The instant invention overcomes these problems. It is an auger carrier designed to hold augers and to be towed behind a snow machine. The carrier has a curved bottom plate that holds the auger cutting head. The bottom plate has a rudder on the bottom to control the auger carrier. The curved plate can also have gussets fastened to the sides of the plate to keep the auger cutting head on the curved plate. Two extension arms are attached to the curved plate. The extension arms are used to extend the length of the auger carrier so that the full length of the auger can be carried. At the top of the extension arms is the mounting plate assembly. This assembly has several components. First, it has a fixture for mounting the auger carrier to the back frame of a snow machine. This fixture is connected by a pivot system to a locking mechanism that secures the handle of the auger. This second fixture secures the auger handle to the auger carrier. The pivot system allows the auger carrier to move freely with respect to the snow machine while under tow. The pivot system is designed to flex vertically as well as horizontally. In this way, rough terrain can be easily traversed without damage to the auger carrier or the auger. The auger is held in place on the auger carrier. It cannot fall off the auger carrier, no matter what conditions may be experienced.

Drilling augers that can be pulled behind a snow machine over complex terrain.

It is another object of this invention to produce an auger carrier for carrying drilling augers that can quickly and easily hold the drilling auger without having to tie the auger onto the auger carrier with rope or other materials.

It is yet another object of this invention to produce an auger carrier for carrying drilling augers that can be pulled over rough terrain without harming the drilling auger.

BRIEF DESCRIPTION OF THE DRAWINGS

FIG. 9 is a back view of the hitch.

DETAILED DESCRIPTION OF THE INVENTION

Figure 1:
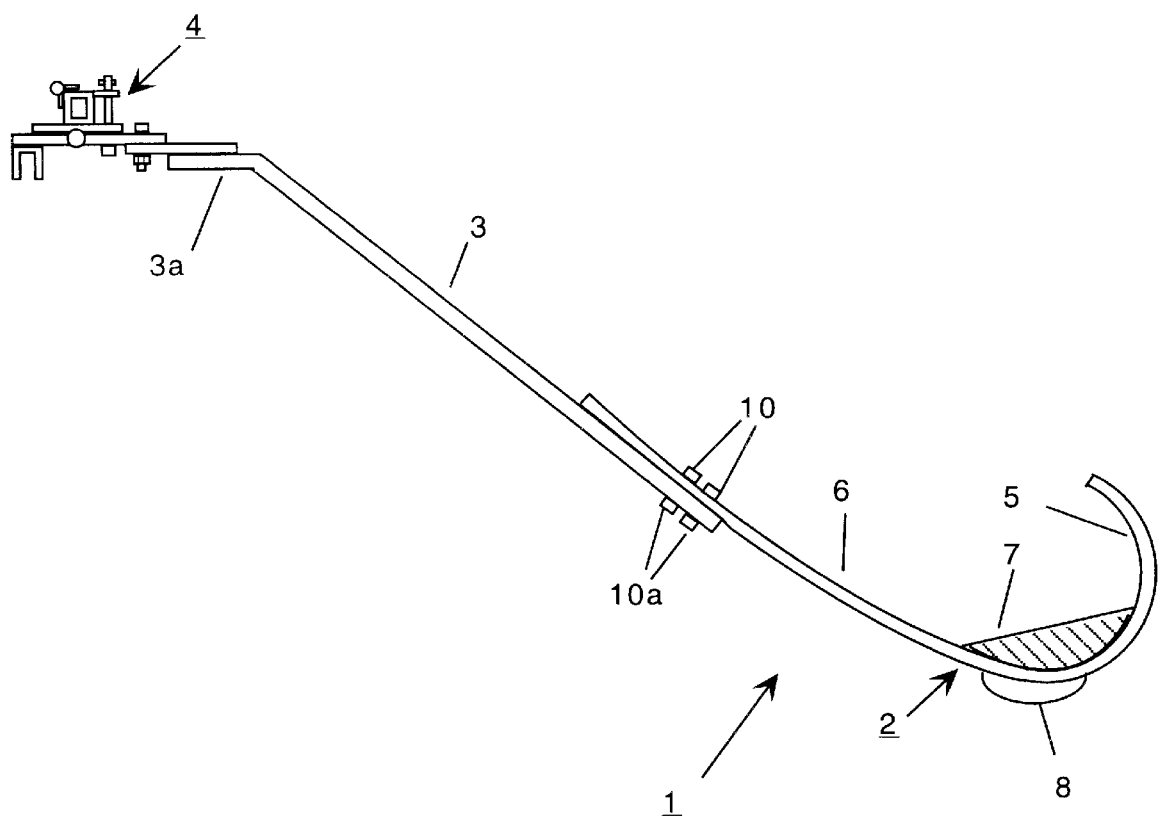
FIG. 1 is a side view of the assembled auger carrier.

Referring now to FIG. 1, a side view of the invention 1 is shown. The auger carrier 1 has three main parts. The first is the curved bottom plate 2. The second is a pair of extension handles 3. The third is a mounting bracket assembly 4. Details of all of these systems are shown in subsequent figures.

Figure 2:
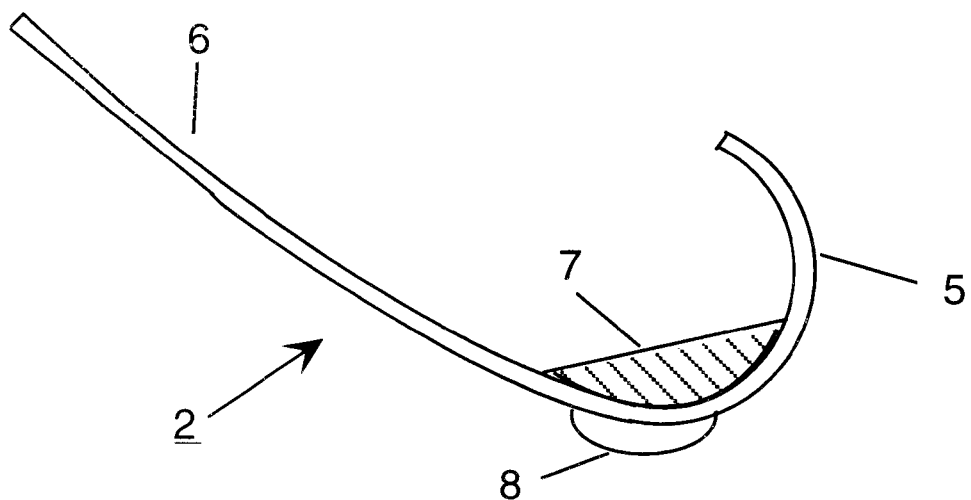
FIG. 2 is a side view of the curved bottom plate.
Figure 3:
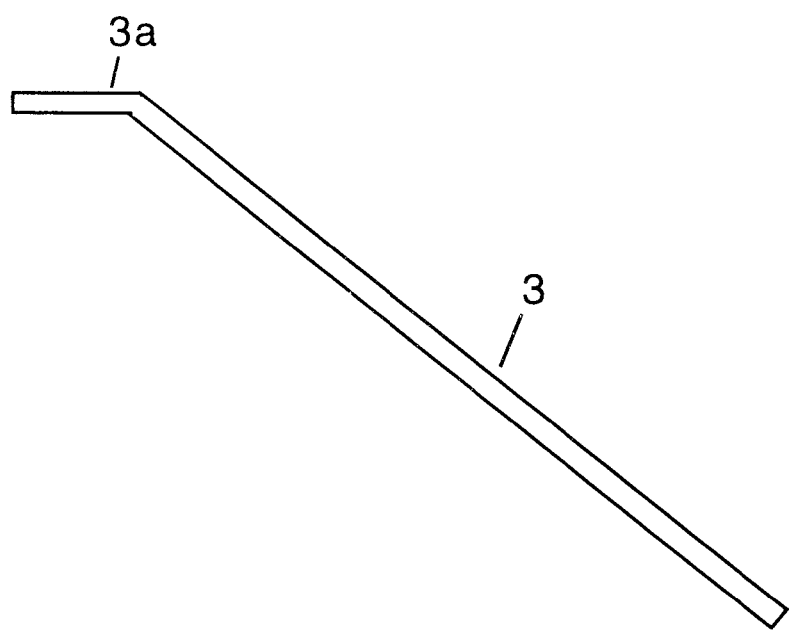
FIG. 3 is a side view of an extension arm.
Figure 4:
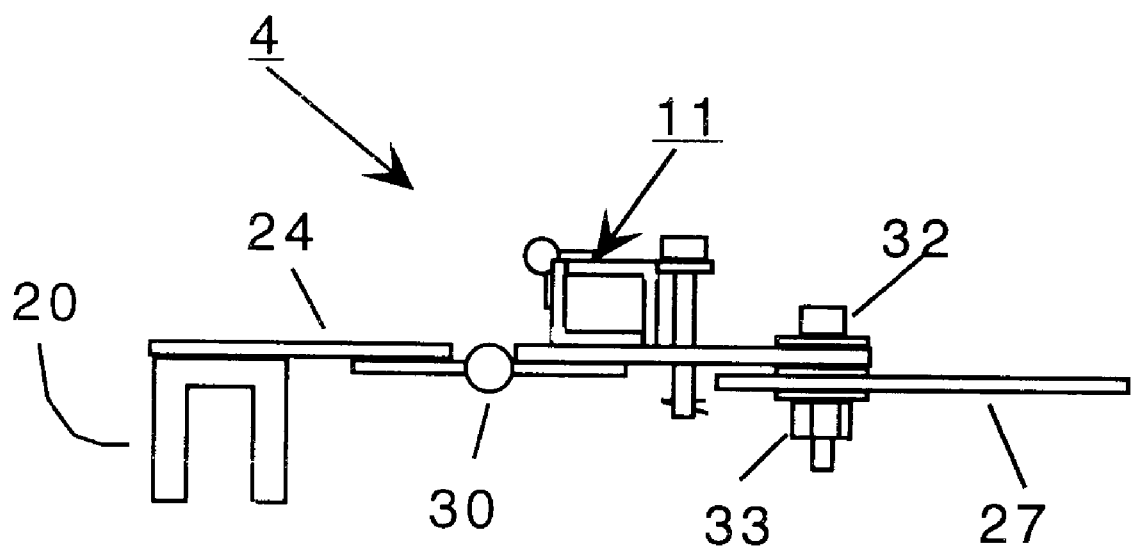
FIG. 4 is a side view of the hinged mounting assembly.

The curved bottom plate 2 is shown in FIGS. 1, 2, 5 and 6. FIGS. 1 and 2 show the side of the curved bottom plate 2. The curved bottom plate has a generally rectangular form. See, e.g., FIG. 5. As shown, the curved bottom plate 2 has a curved lower portion 5 and a straight top 6 portion. The curved bottom portion 5 is reinforced with two gussets 7. The gussets 7 also serve to hold an auger in the auger carrier base 2. A rudder 8 is attached to the bottom 6 of the auger carrier base 2 as shown. The rudder 8 is used to stabilize the auger carrier 1 when it is towed.

Figure 5:
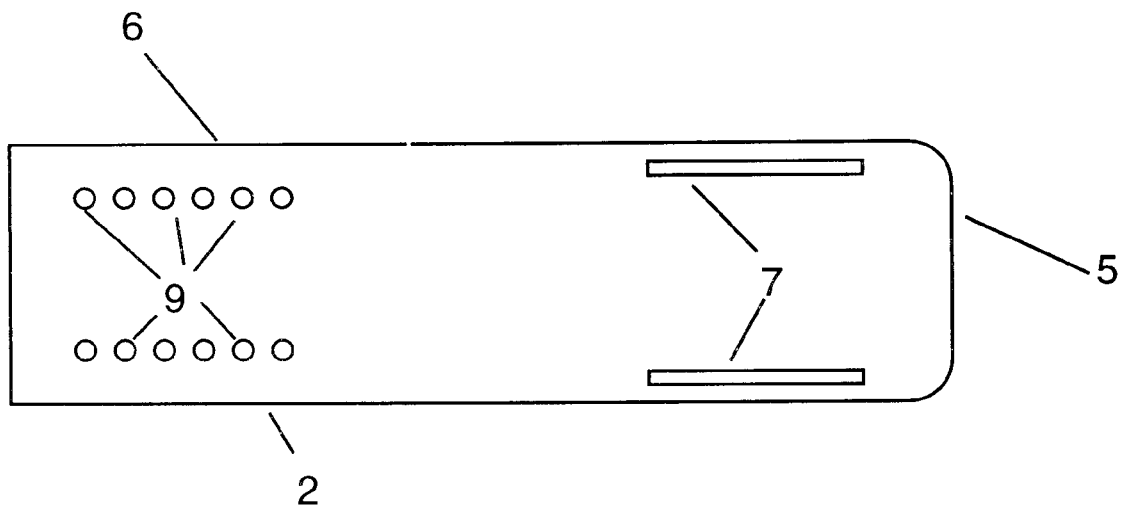
FIG. 5 is a top view of the curved bottom plate.
Figure 6:
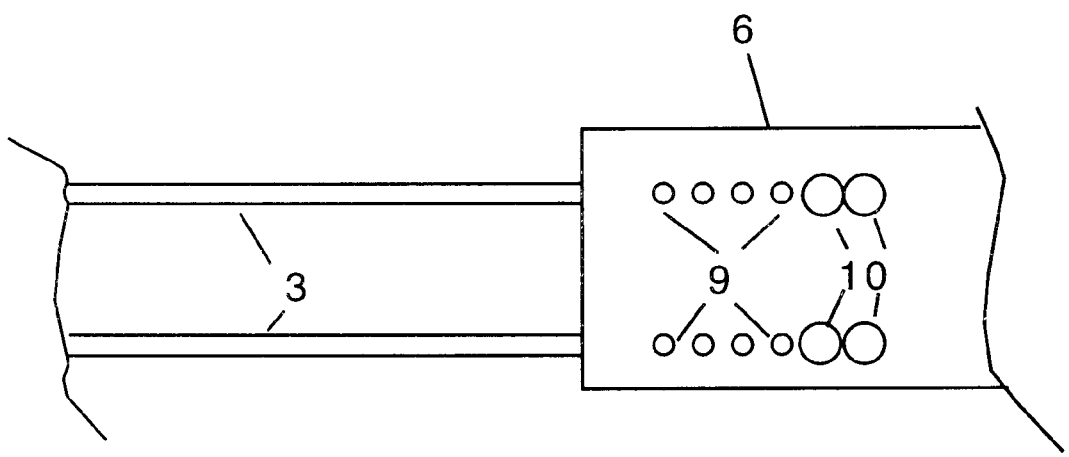
FIG. 6 is a top detail view of the curved bottom plate showing the extension arms attached.

FIGS. 5 and 6 shows that the straight top portion 6 of the curved bottom plate 2 has a number of holes 9 drilled in it to secure the extension handles 3. The extension handles 3 are bolted onto the curved bottom plate 2 using bolts 10 and nuts 10a as shown (see FIG. 1).

Figure 7:
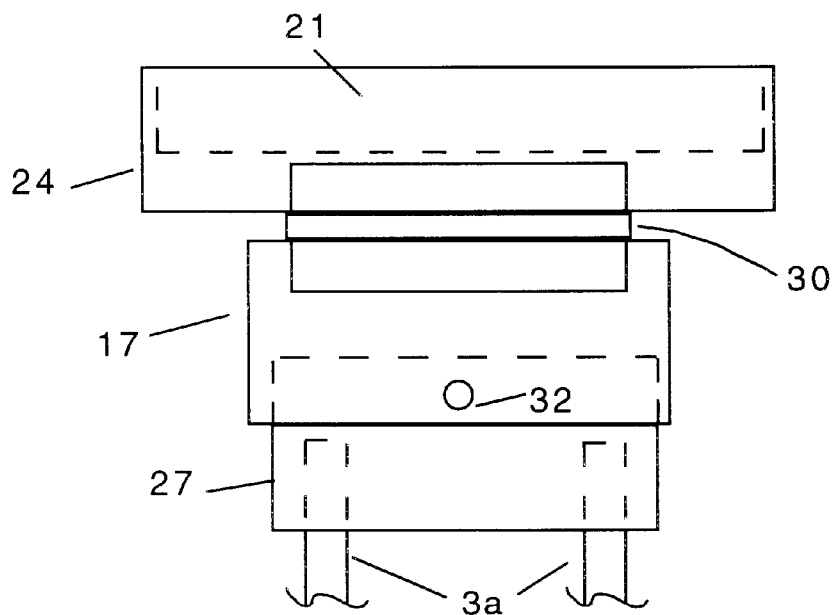
FIG. 7 is a top detail view of the mounting assembly pivot system.

FIG. 1 shows that the top portion 3a of the extension handles is bent to accommodate attachment to the mounting bracket assembly 4 and to ensure that the auger carrier 1 rides at a good angle during towing. FIG. 7 shows the attachment of the handles 3 to the mounting bracket assembly 4.

Referring now to FIGS. 4–7, 11 and 11a, details of the mounting bracket assembly 4 are shown. The mounting bracket assembly 4 has three purposes. First, to secure and hold the handle 100 found on augers. Second, to secure the auger carrier 1 to a snow machine or other vehicle. Third, to provide a means of adjusting the auger carrier angle as it moves over rough terrain. This last purpose is designed to allow the auger carrier 1 to traverse rough terrain without putting strain on either the snow machine or the auger. The auger, as is discussed above, has a long straight shaft, which does not bend easily.

The first purpose, holding an auger handle 100, is performed by a hinged lock box assembly 11, which is mounted at the top of the mounting bracket assembly 4. The hinged lock box assembly 11 is made up of the following components: a lower angle iron 12, an upper angle iron 13, a hinge 14, a locking tab 15 and a locking pin 16. The hinged lock box assembly 11 is mounted to a first plate 17.

Figure 8:
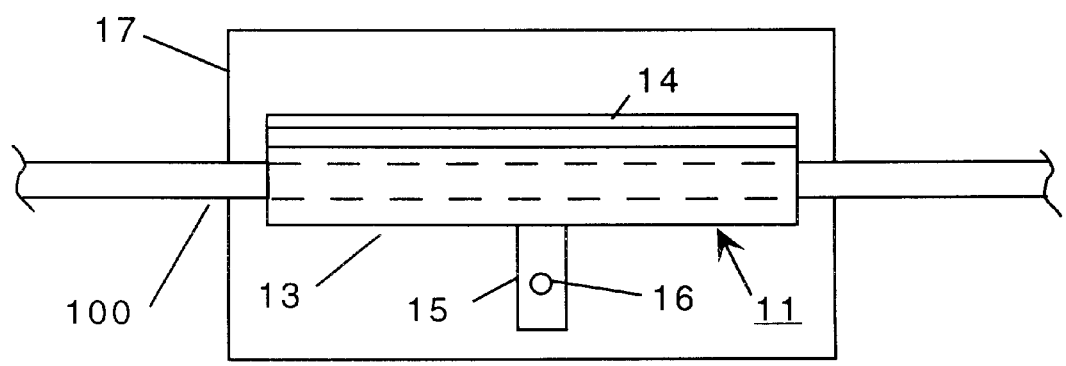
FIG. 8 is a top detail view of the auger handle locking body with an auger handle in place.

The lock box assembly 11 is used by opening the upper angle iron 13 along the line of the hinge. This opens the box and allows the handle 100 to be placed in the box. The upper angle iron 13 is then closed. The locking tab 15 is then aligned with hole in the plate 17. The locking pin 16 is placed through the hole in the plate 17 and the locking tab 15 and then secured in place. This prevents the handle 100 from coming out of the locking box. See FIG. 8.

Figure 9:
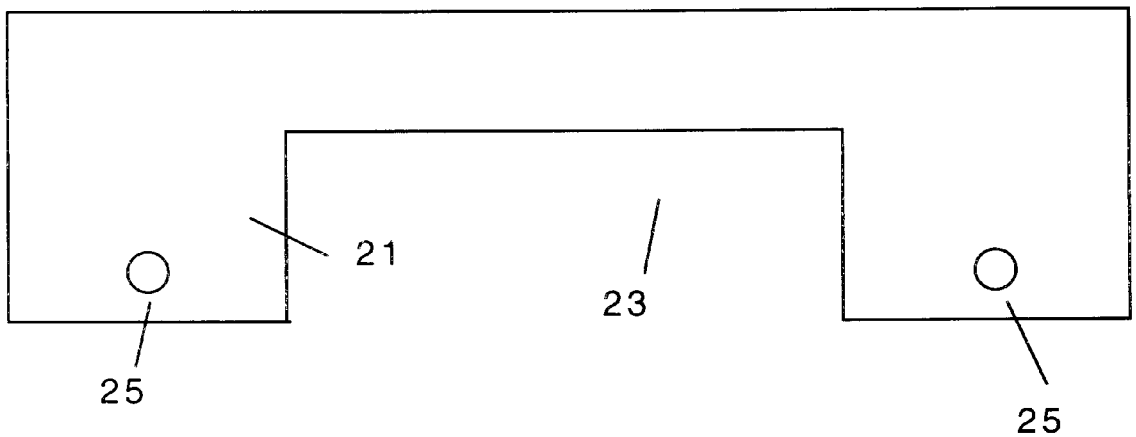
FIG. 9 is a rear view of the mounting hitch plate.
Figure 10:
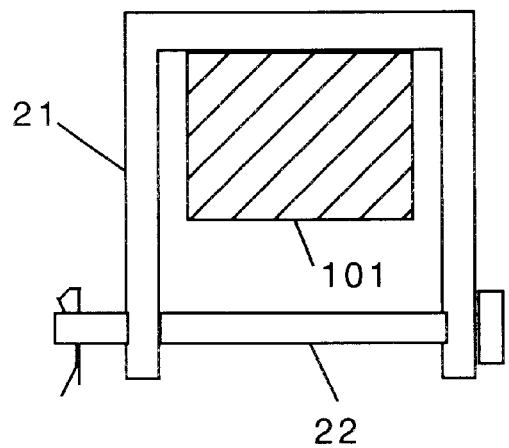
FIG. 10 is an end view of the hitch showing a snow machine back rail in place.

The second purpose-attaching the auger carrier 1 to a snow machine-is accomplished by a hitch assembly 20. The hitch assembly 20 has a hitch body 21, and a pair of pins 22. FIG. 9 shows the back of the hitch body. It is generally a length of angle iron (see also FIGS. 1, 4 and 10). A notch 23 is provided to accommodate the snow machine frame rail 101. See FIG. 10. The hitch body 21 is attached to a second plate 24 by welding or similar means. The hitch assembly 20 is mounted to the rear rail 101 of a typical snow machine. The hitch body 21 is placed over the rail 101 and the pins 22 are placed through the mounting holes 25 as shown. The pins 22 are then locked into place and the hitch assembly 20 is then secure.

Figure 11:
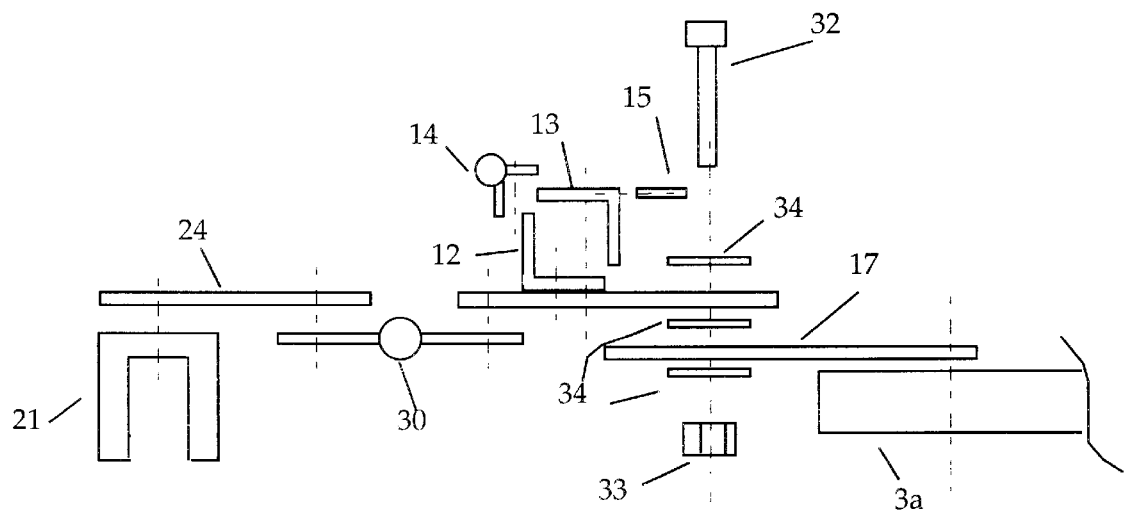
FIG. 11 is an exploded side view of the mounting hitch assembly.
Figure 11A:
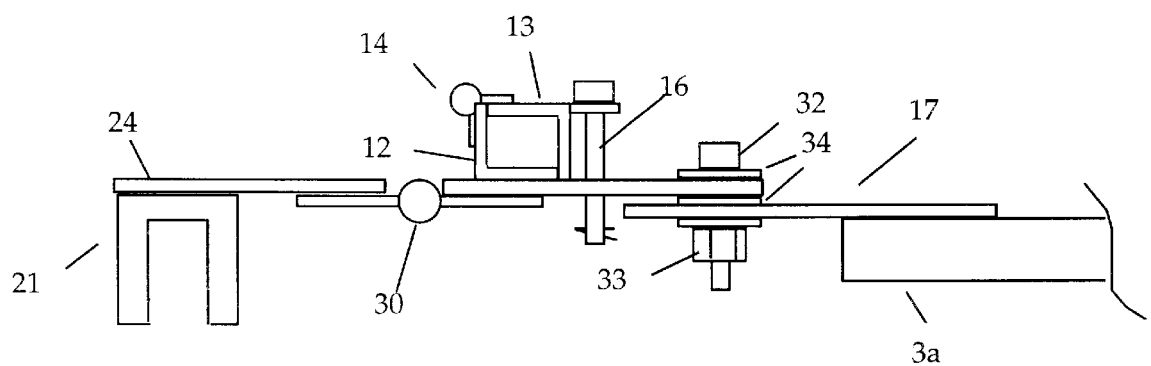
FIG. 11a is an assembled side view of the mounting hitch assembly as attached to the extension arms.

The third purpose is accomplished, in part, by a hinge 30 that is attached to the first plate 17 and to plate 24 as shown. This system is shown in FIGS. 11 and 11a. FIG. 11 shows the entire assembly in an exploded view. FIG. 11a shows the complete assembly as assembled. In this way, the hitch and the remainder of auger carrier can flex independently using the hinge 30. This allows the snow machine to move vertically apart from the auger carrier 1, without causing any strain on the auger carrier 1 or the auger. To provide a second degree of freedom for the auger carrier, the tops 3a of the extension arms 3 are attached to the bottom of a third plate 27 as shown. Plate 27 is then attached to plate 17 using a bolt 32, a nut 33 and a series of washers 34. This allows the plate 27 to rotate about the bolt 32. This allows the carrier to move laterally with respect to the snow machine, without creating stress on the machine or the auger.

To use the auger carrier 1, the auger carrier is placed onto the back of a snow machine or other vehicle. The auger carrier hitch is then secured to the vehicle using pins. An auger is then placed on the auger carrier so that the cutting head rides in the curved bottom plate 2. The handle of the auger is then laid into the locking box. The locking box is then closed and the box is secured. Once the handle is secured, the auger is held securely in the auger carrier. The user can then transport the auger on the auger carrier to any desired location.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. An auger carrier for towing by a snow machine comprising:
   a) a bottom plate, being generally rectangular;
   b) a rudder plate, fixedly attached to said bottom plate and extending perpendicularly downward therefrom;
   c) at least one extension arm having two ends, said extension arm being adjustably attached to said bottom plate at a first end; and
   d) a means for removably attaching said extension arm to a snow machine, being attached to said extension arm at a second end of said extension arm, said means for removably attaching said extension arm to a snow machine further including a hinge to permit said extension arm to flex with respect to said snow machine.

2. The auger carrier of claim 1 further including a pair of gussets, fixedly attached to said bottom plate and extending perpendicularly upward therefrom.

3. The auger carrier of claim 1 wherein the means for removably attaching said extension arm to a snow machine further includes a means for securing a handle of an item being carried in said auger carrier.

4. The auger carrier of claim 1 wherein the means for removably attaching said extension arm to a snow machine further includes a pivot, rotatably attached to said means for removably attaching said extension arm to a snow machine that permits said means for removably attaching said extension arm to a snow machine to rotate with respect to said snow machine.

5. An auger carrier for towing by a snow machine comprising:
   a) a bottom plate, being generally rectangular;
   b) a rudder plate, fixedly attached to said bottom plate and extending perpendicularly downward therefrom;
   c) a pair of extension arms, each arm having two ends, said pair of extension arms being adjustably attached to said bottom plate at a first end of said pair of extension arms;
   d) a first mounting plate, being fixedly attached to said pair of extension arms;
   e) a second mounting plate, being aligned with said first mounting plate;
   f) a hinge, attached to said first mounting plate and to said second mounting plate, whereby said hinge allows said first mounting plate to move with respect to said second mounting plate; and
   g) a hitch member, fixedly attached to said second mounting plate for attaching said auger carrier to a snow machine.

6. The auger carrier of claim 5 further including a pair of gussets, fixedly attached to said bottom plate and extending perpendicularly upward therefrom.

7. The auger carrier of claim 5 further comprising a means for securing a handle of an item being carried in said auger carrier.

8. The auger carrier of claim 5 herein said hinge is attached to said first mounting plate by a pivot member to permit said pair of extension arms to rotate about said pivot member with respect to said snow machine.

9. An auger carrier for towing by a snow machine comprising:
   a) a bottom plate, being generally rectangular;
   b) a pair of extension arms, each arm having two ends, said pair of extension arms being adjustably attached to said bottom plate at a first end of said pair of extension arms;
   c) a first mounting plate, being fixedly attached to said pair of extension arms;
   d) a second mounting plate, being aligned with said first mounting plate;
   e) a hinge, rotatably attached to said first mounting plate and fixedly attached to said second mounting plate, whereby said hinge allows said first mounting plate to move with respect to said second mounting plate;
   f) a locking box, having a front, a back and a top, said top being hingably attached to said back, whereby said locking box secures a handle of an item being carried on said auger carrier;
   g) a means for securing said top of said locking box in a secure position; and h) a hitch member, fixedly attached to said second mounting plate for attaching said auger carrier to a snow machine.

10. The auger carrier of claim 9 further including a pair of gussets, fixedly attached to said bottom plate and extending perpendicularly upward therefrom.

11. The auger carrier of claim 9 further including a rudder plate, fixedly attached to said bottom plate and extending downwardly therefrom.

12. The auger carrier of claim 9 wherein said hinge is attached to said first mounting plate by a pivot member to permit said pair of extension arms to rotate about said pivot member with respect to said snow machine.

13. The auger carrier of claim 9 wherein the hitch member is attached to a snow machine by removable pins.

* * * * *